Oct. 4, 1966  J. H. LEMELSON  3,276,513

COMPOSITE SCREEN ASSEMBLY

Filed Dec. 3, 1962

INVENTOR.
JEROME H. LEMELSON

United States Patent Office 3,276,513
Patented Oct. 4, 1966

3,276,513
COMPOSITE SCREEN ASSEMBLY
Jerome H. Lemelson, 83 Garfield St., Metuchen, N.J.
Filed Dec. 3, 1962, Ser. No. 241,904
5 Claims. (Cl. 160—371)

This invention relates to a new and improved structure in a metal screen having integral supporting means and is a continuation-in-part of my copending application entitled Welding Techniques, Ser. No. 519,014 which was filed on June 28, 1955, now abandoned.

It is known in the art to fabricate a screen or screening of a plurality of filaments or wires of metal which are cross-fastened together to form a mesh and to support said screening by means of a frame or otherwise shaped structure to which the screening is mechanically fastened or welded. Metal screens are utilized for many household and industrial purposes and are fabricated into a variety of shapes and retained in said shapes primarily by fastening the edges or borders of the screening to a frame of array of struts or structural members. Most of the fabricating and assembly techniques employing screening suffer many short comings. In addition to requiring a substantial amount of assembly labor and being time consuming, the methods which involve mechanically assemblying screening with the frame by means of fasteners, frequently provide an inferior product. For example, screens or screening held by fasteners has a tendency to easily sag during use since the individual fasteners which penetrate the screen mesh only afford local support therefor and the screening between fasteners is substantially unsupported. As a result, forces applied to the screening may act to stretch the screening in the area of one or more of the fasteners resulting in a deformed or sagging screen assembly. The fabrication of screen devices employing welding or brazing is not only time and labor consuming but also requires careful control of the flow of the welding metal and post finishing the assembly and/or the application of a means for covering the screening where welded.

It is accordingly a primary object of this invention to provide a new and improved structure in a metal screen assembly and a method for producing same.

Another object is to provide an improved screen assembly in which portions of the creen are encapsulated or embedded within portions of the supporting frame.

Another object is to provide an improved metal screen assembly including a section of screening and frame therefor secured to the screening in such a manner that, where so secured, each filament of the screening will be uniformly retained by and within the frame.

Another object is to provide an improved assembly means for screening and a support therefor in which both longitudinal and lateral local deformation of the screening due to relative movement of a portion of the screen and the support is substantially eliminated.

Another object is to provide an improved method and apparatus for rapidly producing assemblies including screening and frame supporting means therefor.

Another object is to provide a new and improved structure in a screen supported and strengthened sheet of metal and a method for producing same.

The invention also consists of certain and original features of construction and a combination of parts hereinafter set forth as claimed.

The nature of the invention, as to its objects and advantages, the mode of its operation and the manner of its organization may be better understood by referring to the following description taken in connection with the accompanying drawing forming a part thereof in which;

FIG. 1 illustrates a structure in a metal assembly applicable for the fabrication of various articles of manufacture which employ as a component thereof, a screen, grid or grating made of metal. The assembly 10 may include, in addition to the components and structure illustrated, additional components and structural features defining the completed article or product.

Figures 1, 2:
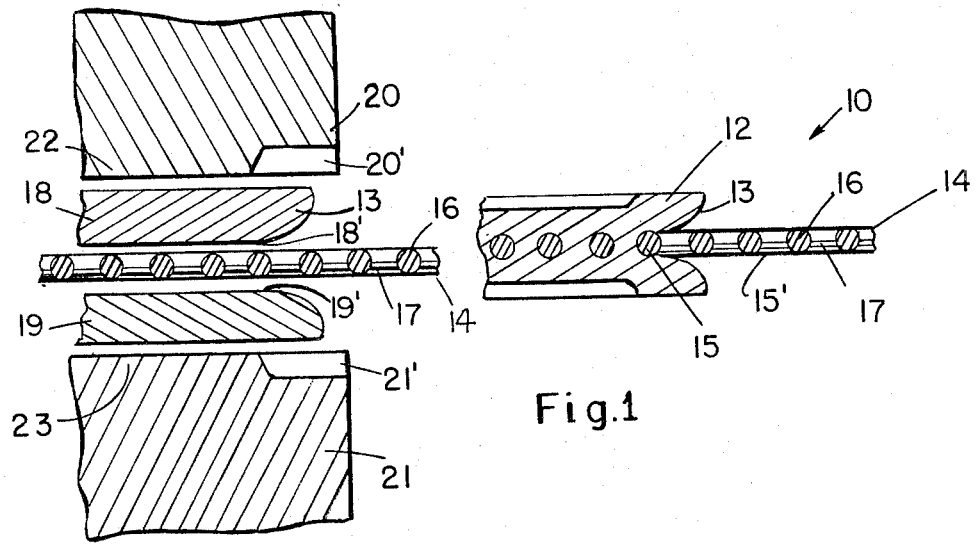
FIG. 1 is a fragmentary view in side cross section of a composite screen assembly made in accordance with the teachings of this invention and FIG. 2 is a side view taken in cross section of an apparatus operative to produce a screen assembly of the type illustrated in FIG. 1.

One component of the assembly 10 comprises a mesh, grid, screen or grating 14 a portion 15 of which is shown encapsulated or embedded within a metal member 12 which may comprise a portion of a frame or support for the grid or grating 14. The member 12 is preferably made of a non-ferrous metal such as aluminum, brass, zinc or other non-ferrous metals or alloys capable of being extruded, forged, cast or otherwise provided in the desired shape. The screen or grating 14 is preferably made of a ferrous metal or alloy such as steel or any suitable metal of greater rigidity or compressive strength than the metal of which 12 is made.

The screening 14 is shown as being made of a plurality of individual wires or filaments of metal such as the plural lateral filaments 16 shown in cross section which are joined by a plurality of longitudinal filaments 17 which define the grid or grating. The grid 14 may also comprise a sheet of metal which has been die-stamped with openings therein which define parallel longitudinal and lateral screen or grid elements as illustrated.

As portion 15 of the screen or grating 14 is shown extending through the center of the supporting element 12 and is defined by the metal thereof completely surrounding and encapsulating each individual wire or grid element.

The structure 10 illustrated in FIG. 1 may be utilized in the fabrication of various devices such as framescreen such as window screens, door screens, filter screens or the like. For many applications, the portion 15' of screen 14 which extends outward from the metal support or frame 12 may be subject to flexure or bending relative to 12. Where such forces are applied and operate to deflect portion 15' or the screen relative to 12, the screen elements immediately adjacent the support or frame 12 may be subject to extreme bending capable of eventually causing failure of the individual elements or portion of 14 subjected to said bending. As the results, the inside edges 13 of 12 which immediately abut the screening 14 as it enters member 12 are shown tapered or rounded so that the bending of screen 14 will not be effected around a sharp edge.

The assembly 10 of FIG. 1 may be fabricated by various techniques, one of which is illustrated in FIG. 2. The screen 14 is shown positioned between two sheets or plates 18 and 19 of pressure weldable metal having the facing edges 13 thereof rounded. The plates 18 and 19 are shown assembled between two pressure welding dies 20 and 21 which are shaped with welding portions or tips 22 and 23 for compressively engaging the outer faces of said plates and deforming the metal of each through the openings in the portion 15 of the grid or screening 14 and to become molecularly bonded together after completely encapsulating the elements of said screening defined in the portion 15 thereof. The faces 18' and 19' of sheet or plate members 18 and 19 are preferably cleaned and deoxidized just prior to performing the operation of encapsulating the screen 14 therebetween so that pressure welding of the assembly will be simplified.

Following the encapsulation of a portion of the screen 14 within the non-ferrous member 12 as illustrated in FIG. 1, further operations may be performed on either or both the screen and support portion of the assembly. It is noted that the member 12 may extend as a strip or bar across a central portion of the screen 14 which may extend outward from the other side of 12.

If the assembly 10 is utilized as a structure in a window or door screen whereby the support portion 12 defines a portion of the frame or is supported by the frame, it is briefly noted that the usually tedious operation of assembling a metal screen with a frame by manually cutting, inserting, clampingly engaging and fastening frame portions and the screen together will be eliminated.

I claim:
1. A screen assembly comprising:
 (a) a flat metal grid member; and
 (b) a frame member formed as a continuous unit about the entire peripheral edge of said grid member;
 (c) said frame comprising a metal having a lower compressive strength than said metal grid;
 (d) said frame having sandwiching sections of substantial thickness on each side of said edge of said grid to provide a rigid reinforcing structure and material of said frame member passing through the mesh openings of said grid to form a unitary mass of metal with said sandwiching sections in intimate contact with the exterior contours of the individual grid portions of said grid member.

2. A screen assembly in accordance with claim 1 wherein the unitary mass of metal forming the frame is formed by pressure welding.

3. A screen assembly in accordance with claim 1 wherein the metal of the grid member is a ferrous metal and the metal of the frame member is a non-ferrous metal.

4. A screen assembly comprising:
 (a) a flat metal grid member; and
 (b) a metal reinforcing member formed on at least a part of said grid member;
 (c) said reinforcing member having lip sections formed on each side of said grid gradually curving inwardly toward the center of said grid and upwardly away from said grid;
 (d) said reinforcing member having sandwiching sections of substantial thickness on each side of said grid to provide a rigid reinforcing structure and material of said frame member passing through the mesh openings of said grid to form a unitary mass of metal with said strip sections in intimate contact with the strands of said grid from a point just beyond said lip sections to the opposite edge of said reinforcing member.

5. A screen assembly in accordance with claim 4 wherein the unitary mass of metal is formed by pressure welding to a thickness less than the thickness of said reinforcing member on either side of said lip sections.

References Cited by the Examiner

UNITED STATES PATENTS

| | | | |
|---|---|---|---|
| 246,407 | 8/1881 | McTighe | 29—470.1 X |
| 279,851 | 6/1883 | Anderson | 160—371 X |
| 1,280,908 | 10/1918 | Wales et al. | 29—191.4 |
| 1,769,177 | 7/1930 | Conley | 160—380 |
| 2,297,729 | 10/1942 | Thomas | 160—380 X |
| 2,357,578 | 9/1944 | Brownback | 29—191.4 |
| 2,567,743 | 9/1951 | Stafford et al. | 160—380 |
| 2,644,769 | 7/1953 | Robinson | 117—17 |
| 2,701,483 | 2/1955 | Foxon et al. | 29—470.1 |
| 2,755,199 | 7/1956 | Rossheim et al. | 117—17 |
| 2,767,467 | 10/1956 | Siegel | 29—497.5 |
| 2,809,422 | 10/1957 | Schultz | 29—497.5 |
| 2,831,950 | 4/1958 | Lefebvre | 338—226 |
| 2,853,195 | 9/1958 | Malcolm. | |
| 2,886,481 | 5/1959 | Swan | 160—354 X |
| 2,909,752 | 10/1959 | Mazzucchelli et al. | 338—226 |
| 2,961,759 | 11/1960 | Weissfloch | 29—471.1 X |
| 3,048,897 | 8/1962 | Slade | 160—371 X |

HARRISON R. MOSELEY, *Primary Examiner.*

R. R. RATH, P. C. KANNAN, *Assistant Examiners.*